United States Patent [19]

Duerkob

[11] Patent Number: 4,954,808
[45] Date of Patent: Sep. 4, 1990

[54] EYE LEVEL REAR MOUNTED LIGHTED TURN AND STOP SIGNAL FOR VEHICLES

[75] Inventor: Manfred F. Duerkob, Franklin, Mo.

[73] Assignee: Dorothy I. Duerkob, Pacific, Mo.

[21] Appl. No.: 390,197

[22] Filed: Aug. 7, 1989

[51] Int. Cl.⁵ ............................................. B60Q 1/38
[52] U.S. Cl. ................................... 340/475; 362/80.1; 40/573
[58] Field of Search .................. 340/475, 479, 464; 362/80.1, 80; 40/523, 564

[56] References Cited

U.S. PATENT DOCUMENTS

| | | | |
|---|---|---|---|
| 1,122,100 | 12/1914 | Gilsey | 40/573 |
| 1,513,515 | 10/1924 | Luker | 362/80 X |
| 1,596,216 | 8/1926 | Pangburn | 40/573 X |
| 1,629,425 | 5/1927 | Wardhaugh | 362/80.1 |
| 1,691,502 | 11/1928 | Snyder | 340/475 |
| 1,730,975 | 10/1929 | Jacobsen | 40/573 |
| 1,866,185 | 7/1932 | Yarnell | 362/80.1 |
| 2,026,710 | 1/1936 | Smith | 40/573 |
| 2,597,584 | 5/1952 | Hopkins | 40/573 X |
| 3,905,017 | 9/1975 | Samra | 362/80.1 X |
| 4,736,280 | 4/1988 | Simidian | 362/80 |

FOREIGN PATENT DOCUMENTS 396789  6/1932  United Kingdom ................ 340/475

*Primary Examiner*—Joseph A. Orsino
*Assistant Examiner*—Brian R. Tumm

*Attorney, Agent, or Firm*—Polster, Polster and Lucchesi

[57]  ABSTRACT

A lighted turn and stop signal for rear mounted, eye level use on an inside shelf of an automobile is disclosed. The unit includes an elongated housing having spaced end compartments and an intermediate compartment, with one open side for each compartment, which together serves as the rear side of the unit when mounted on the inside rear shelf of an automobile. A light is provided in each compartment which is shielded from the other compartments and visible from each open side. The lights in the end compartments are electrically connected to the automobile left and right turn signal indicators while the light in the intermediate compartment is electrically connected to the automobile brake pedal. An elongated material strip extends across the open sides of the compartment and is operatively associated with covered lens covers for the open side of each compartment. The elongated material strip includes arrow-shaped left-turn and right-turn openings for the end compartments and an elongated intermediate opening for the intermediate compartment. Upon operating either the left or right turn indicators and/or the brake pedal of the automobile, the lights in the compartments will project a light beam through the left-turn or right-turn arrow-shaped openings or the elongated intermediate opening of the elongated material strip, to provide early advanced warning to following vehicles regarding vehicle turning or stopping.

13 Claims, 3 Drawing Sheets

EYE LEVEL REAR MOUNTED LIGHTED TURN AND STOP SIGNAL FOR VEHICLES

BACKGROUND OF THE INVENTION

The present invention relates to a vehicle turning and stopping warning system, and more particularly to a lighted turn and stop signal unit for rear mounted, eye level use on an inside rear shelf of an automobile.

Some recent models of automobiles are equipped with rear mounted, eye level brake lights which are mounted on the inside rear shelf of the automobile. Such eye-level brake lights are easily seen by drivers of following vehicles and give additional or early warning time concerning stopping. Such devices have met with commercial success and have proven to be extremely effective in use.

In addition to serving as a brake or stop signal, some prior art devices have even suggested the use of turn signal indicators or lights mounted in connection with the rear window or rear portion of a vehicle so as to provide an eye-level warning or turning indicator for vehicles. Examples of such devices are shown in the U.S. Pat. Nos. 4,631,516; 4,734,697 and 4,613,927 which both show eye-level rear shelf mounted light assemblies including brake lights, turn signals, back-up lights and other signals concerning the operation of an automobile containing such units U.S. Pat. Nos. 3,614,733 and 3,784,974 show eye-level stop and signal lights mounted externally of an automobile on vertical arms or probes for eye-level visibility to following vehicles. While such combination brake and turn signal indicator device have identified a definite product need, they have not been effective, either by themselves or in conjunction with commercially successful brake signal devices. Complexity, function and cost have inhibited the successful development and use of a lighted turn and stop signal unit for rear mounted, eye-level use on an inside rear shelf of an automobile.

SUMMARY OF THE INVENTION

Among the several objects and advantages of the present invention include:

The provision of a lighted turn and stop signal unit for rear mounted, eye-level use on an inside rear shelf of an automobile which overcomes the aforenoted deficiencies of prior art devices;

The provision of the aforementioned lighted turn and stop signal unit which provides early and advanced turn and stop signal warning at eye-level visibility to following cars concerning either a right-turn or left-turn or braking operation of the vehicle containing such units;

The provision of the aforementioned lighted turn and stop signal unit which includes three compartments, including two end compartments and an intermediate compartment, all containing lights electrically connected to the left or right turn indicators or brake pedal of the automobile, and with the end compartments projecting a light beam in the shape of a left-turn or right-turn arrow, while the intermediate compartment provides a braking light;

The provision of the aforementioned lighted turn and stop signal unit which provides colored lenses for the left or right turn indicators and the brake light such as yellow lenses for the left or right turn arrow indicators and a red lens for the brake light indicator;

The provision of the aforementioned lighted turn and stop signal unit which includes a housing wherein the compartments are separated from each other by a light shield element which, in one embodiment, also serves to support the lights in each compartment; and The provision of the aforementioned lighted turn and stop signal unit which provides an extremely simple and easy to manufacture unit which is made up of minimum number of parts to enable low cost production and distribution of such units for widespread commercial use.

Briefly stated, the present invention is directed to a lighted turn and stop signal unit for rear mounted, eye level use on an inside rear shelf of an automobile. Such unit includes, in combination, an elongated housing having spaced end compartments and an intermediate compartment each having one open side, on the same side thereof, and serving together as the rear side of said unit when mounted on the inside rear shelf of an automobile. A light is provided in each compartment which is shielded from the other compartments and visible from each open side. The lights in each end compartment are electrically connected to automobile left and right turn signal indicators while the light in the intermediate compartment is electrically connected to the automobile brake pedal. Colored lens covers are provided for the open side of each compartment. An elongated material strip extends across the open sides of the compartments and is operatively associated with the colored lens covers. The elongated material strip includes arrow-shaped left-turn and right-turn openings for the end compartments of the housing and an elongated intermediate opening for the intermediate compartment. A cover is secured to the housing so as to overlie and capture the elongated material strip and colored lenses between the cover and the housing. When either the left-turn or right-turn indicators and/or the brake pedal of the automobile is engaged, the lights in the compartments will project a light beam through the left-turn or right-turn arrow-shaped openings for the elongated intermediate opening of the elongated material strip to provide early advanced warning to following vehicles of turning or stopping the automobile containing such unit.

Each of the compartments of the housing are defined by a bottom wall and at least two sides, with at least one separate light shield element operatively associated relative to a respective compartment. The end compartments include a bottom wall and three sides of the housing together with a light shield for each end compartment. The intermediate compartment includes a bottom wall and two opposed sides together with two separate light shield elements. In one embodiment, each light shield supports a light in each compartment while also serving to shield the compartments from each other. Each separate light shield element includes a foot portion secured to the bottom wall of a respective compartment and an upstanding wall portion for supporting a light in its respective compartment. Each separate light shield further includes an opening for receiving a threaded light socket therein in order that a light may be threadably mounted in each such light socket.

In a different embodiment, the light shields are separate from light support bracket which is attached to the bottom of the compartments and supports a light in each compartment. The light support bracket includes a bracket base and upstanding light supports, preferably extending at an angle of 18° relative to the bracket base.

The colored lens covers for the two end compartments preferably have a different color than the lens cover for the intermediate compartment. Specifically, the colored lens covers for the two end compartments are colored yellow while the lens cover for the intermediate compartment is colored red.

The elongated material strip includes peripheral marginal areas serving as a gasket that is engaged by both the cover and the housing when secured together. The cover has window openings framing the arrow-shaped left-turn and right-turn openings in the elongated material strip for the end compartments, and the elongated intermediate opening in the elongated material strip for the intermediate compartment. In certain embodiments, clear plastic cover sections may be provided for the window openings in the cover.

The housing, cover, lens cover and cover sections, when used, are all made from various types of plastic material, providing light weight, economical and easy-to-manufacture components. The light shield elements are formed as one-piece metal elements which are easily assembled and mounted in place within the housing. The elongated material strip is formed from a pliable gasket-like material with die-cut arrow-shaped left turn and right turn openings and the elongated intermediate opening. A light hole may be provided in each compartment of the housing on a side of the housing opposite the open side in order to enable the automobile operator to observe the operation of the unit.

These and other objects and advantages of the present invention will become more apparent in the description that follows.

BRIEF DESCRIPTION OF THE DRAWINGS

In the drawings.

Corresponding reference numerals will be used throughout the several figures of the drawings.

DESCRIPTION OF THE PREFERRED EMBODIMENT

The following detailed description illustrates the invention by way of example and not by way of limitation. This description will clearly enable one skilled in the art to make and use the invention, and describes several embodiments, adaptions, variations, alternatives and uses of the invention, including what I presently believe is the best mode of carrying out the invention.

In the description that follows, it will be seen that FIGS. 1-4 illustrate the lighted turn and stop signal unit of the present invention and its manner of operation on an inside rear shelf of an automobile; FIGS. 5-8 illustrate one embodiment of the lighted turn and stop signal unit of the present invention; and FIGS. 9-15 illustrate another embodiment of the lighted turn and stop signal unit of the present invention.

In FIGS. 1-4, it will be seen that the lighted turn and stop signal unit 1 of the present invention is designed for rear mounted, eye level use on the inside rear shelf of an automobile 3, similar to the rear mounted, eye level brake light mounted on the inside rear shelf of certain types of automobile makes. In addition to a brake light 5, the lighted turn and stop signal unit of the present invention includes lighted left turn and right turn indicator arrows 7, 9 respectively to provide eye-level early advance warning to following vehicles that the automobile 3 is either stopping or making a left or right turn.

Figure 2:
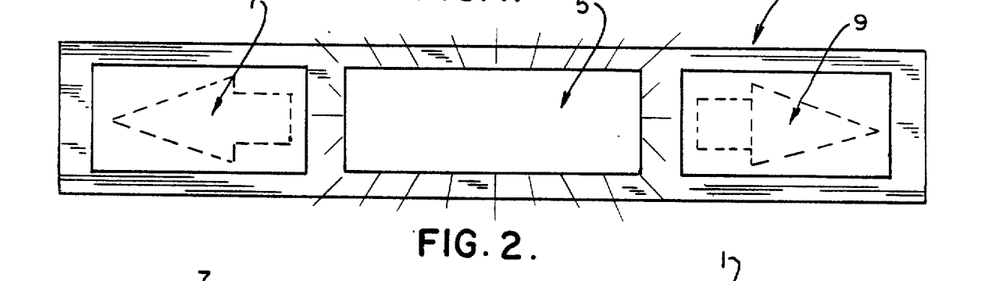
FIG. 2 is an enlarged view of the lighted turn and stop signal unit of the present invention and indicating lighting of the brake light of such unit.
Figure 3:
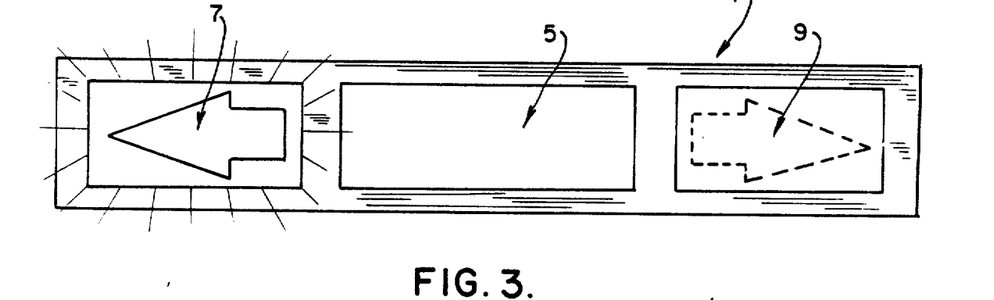
FIG. 3 is an enlarged end elevational view of the lighted turn and stop signal unit of the present invention and illustrating lighting of the left-turn indicator.
Figure 4:
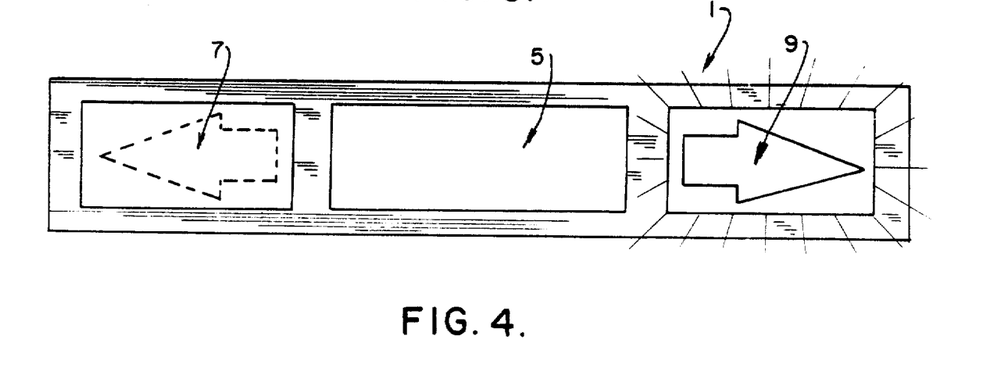
FIG. 4 is also an enlarged end elevational view of the lighted turn and stop signal unit of the present invention and illustrating lighting of the right-turn indicator light.

In FIG. 2 of the drawings, the lighted turn and stop signal unit 1 illustrates the brake light 5 as being lit, thus indicating braking or stopping of the automobile 3, while FIGS. 3 and 4 illustrate that the left turn indicator arrow 7 or right turn indicator arrow 9 has been activated to indicate left turn or right movement of the automobile 3, also from eye-level visibility. Similar to braking and indicator lights incorporated in the rear fender or bumper of vehicles, the eye level lighted turn and stop signal unit 1 is also electrically connected to the automobile brake pedal or left and right turn indicators, as will be understood, to accomplish the purposes set forth above.

With this broad understanding of the operation and use of the lighted turn and stop signal unit 1 of the present invention, attention is first directed to one modified form of the invention illustrated in FIGS. 5-8 of the drawings. There, it will be seen that the lighted turn and stop signal unit 1 includes an elongated housing 11 having spaced end compartments 13, 13 and an intermediate compartment 15. The elongated one-piece housing 11 is preferably added molded from plastic material and includes a bottom wall side 17, opposed elongated sides 19, 19 which extend upwardly from the bottom wall side 17, and opposed end sides 21, 21 also extending upwardly from the bottom wall side 17 and interconnecting the opposed elongated sides 19, 19 at opposite marginal areas thereof to provide the one-piece unitary housing structure 11. It will be seen that the housing 11 includes one open side at the upper marginal areas of the opposed elongated sides 19, 19 and opposed end sides 21, 21, generally designated 23, and representing, as will be seen, the rear side of the lighted turn and stop signal unit 1 when mounted on the inside rear shelf of an automobile 3.

Figure 5:
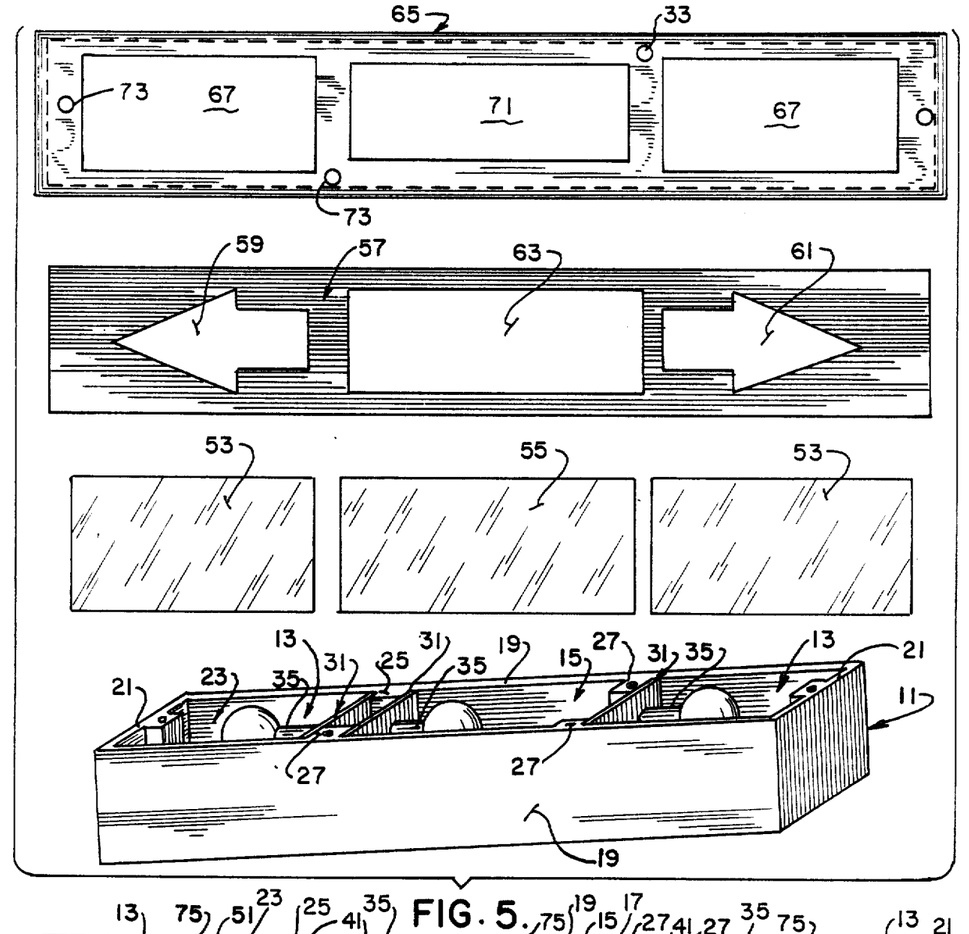
FIG. 5 is an exploded partial isometric and partial top plan view of the various components of the lighted turn and stop signal unit of the present invention.
Figures 6, 7, 8A, 8B:
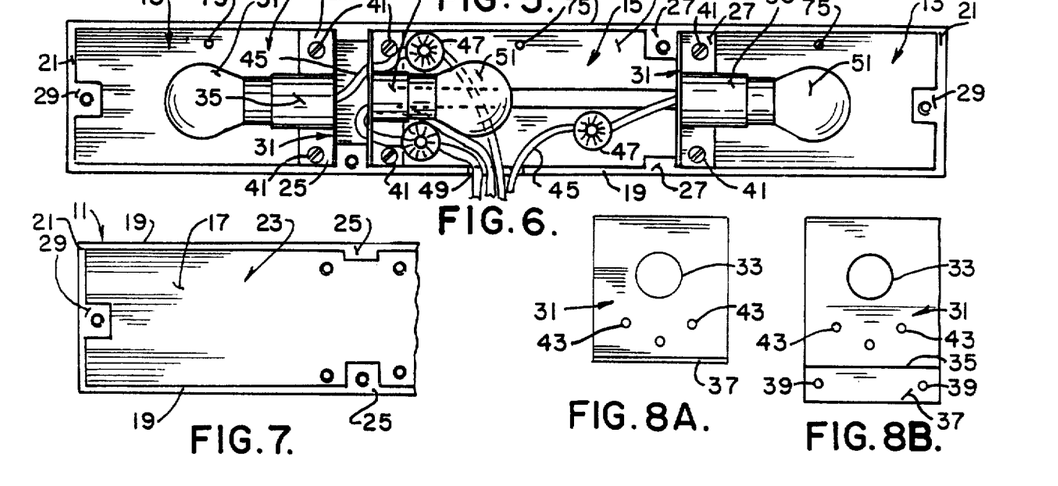
FIG. 6 is a top plan view of the lighted turn and stop signal unit of the present invention with the cover removed so as to illustrate the various compartments within the unit including light shield elements and associated lights supported thereby.
FIG. 7 is a fragmentary top plan view of the housing unit only of the lighted turn and stop signal unit of the present invention.
FIG. 8A is a side elevational view of the combined light shield and bracket element used in the compartments of the housing unit.
FIG. 8B is a side elevational view of the combined light shield and bracket element as it is initial stamped prior to folding or forming of the foot portion thereof.
Figure 9:
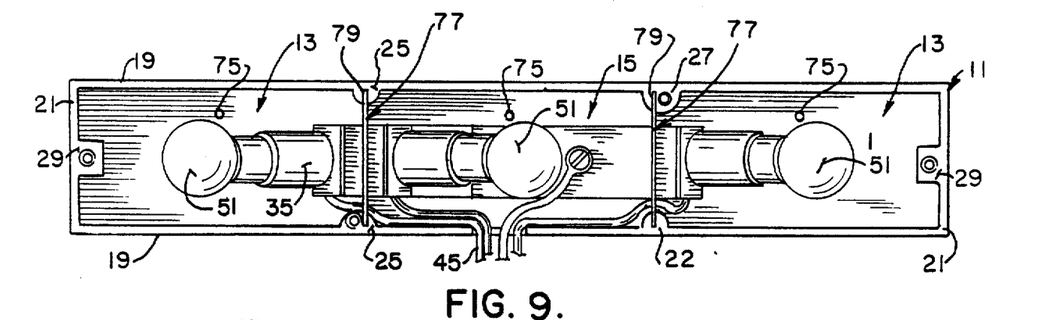
FIG. 9 is a top plan view of a modified form of lighted turn and stop signal unit of the present invention, with the cover removed to illustrate the modified unit including the various compartments within the unit with separate light shield elements light support bracket for supporting lights within the compartments.
Figure 10:
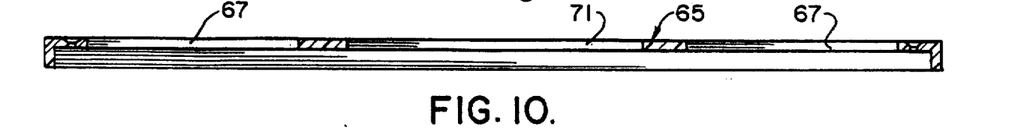
FIG. 10 is a side sectional view of the cover used to cover both forms of units shown in FIGS. 9 and 11-15 and in the unit constructed in accordance with FIGS. 5-8.
Figure 11:
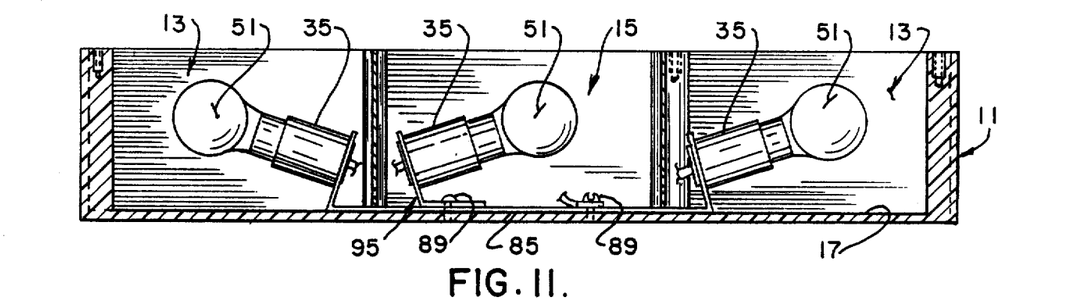
FIG. 11 is a side sectional view of the lighted turn and stop signal unit as shown in FIG. 9 of the drawings, with the cover shown in FIG. 10 removed therefrom.
Figure 12:
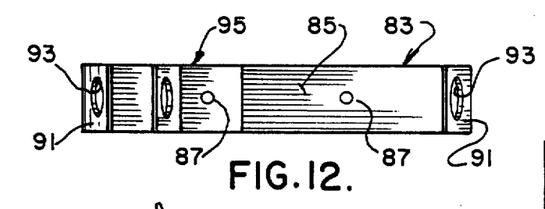
FIG. 12 is a top plan view of the light support bracket used in the FIGS. 9 and 11-15 embodiment.

To assist in segregating the housing 11 into at least end compartments 13, 13 and intermediate compartment 15, while at the same time enabling a housing cover to be attached thereto, it will be seen that opposed elongated sides 19, 19 are provided with spaced inwardly directed lugs 25, 27 on each of the elongated sides 19 which are in mirror image and aligned relationship with inwardly directed lugs 25, 27 on the other elongated side 19. The end sides 21, 21 are also provided with opposed mirror image and aligned lugs 29, 29 to facilitate attachment to the housing cover, as will be subsequently described.

In order to segregate the housing 11 into individual compartments comprising the end compartments 13, 13 and intermediate compartment 15, the combined light shield and light support element 31 shown in FIGS. 8A and 8B is provided. The light shield and support element 31 is initially formed as shown in FIG. 8B as a rectangular-shaped flat element having an aperture 33 for operable association relative to the light sockets 35 (See FIGS. 5-6). Further, the combined light shield and support bracket 31 includes a fold line or hinge 35 in order to enable the initially flat portion 37 to be formed from the position shown in FIG. 8B to that shown in FIG. 8A where it forms a foot portion 37. Spaced apertures 39, 39 are formed in the foot portion 37 for receiving the threaded fasteners 41 therein, as shown in FIG. 6 of the drawings, in order to secure the foot portion 37 and the entire combined light shield and support bracket 31 to the bottom wall 17 of the housing 11 in close fitting relationship to the spaced inwardly directed lugs 25, 27. The combined light shield and support bracket 31 also includes a series of spaced holes 43 enabling interconnecting wires 45, shown in FIG. 6 of the drawings, to be threaded therethrough.

As can best be seen in FIGS. 5-6 of the drawings, the combined light shield and support brackets 31 have the foot portions 27 thereof attached to the bottom wall 17 of the elongated housing by the threaded fasteners 41. To form the end compartments 13, 13, the combined light shield and support elements 31 are positioned into close proximity relative to opposed inwardly directed mirror image lugs 25, 25 and 27, 27 on opposite sides of the housing 11. While the light shields 31, 31 at opposite ends of the housing 11 not only form the end compartments 13, 13, they also form the intermediate compartment 15 as well. However, it is necessary for a light to be supported in the intermediate compartment 15, and thus a combined light shield and support element 31 is fastened by the fasteners 41 on an opposite side of the inwardly directed opposed mirror image lugs 25, 25, as shown in FIG. 6 of the drawings.

Following the mounting of the combined light shields 31 to form the opposed end compartments 13, 13 and the intermediate compartment 15, the light supports 35 are mounted in operable association relative to the openings 33 thereof, with the lead wires 45 also being threaded through the opening 43 in the combined light shield and support element 31. FIG. 6 of the drawings shows the lead wires 45 interconnected to one another by way of the wire connector 47, and also extending through an opening 49 in one of the elongated sides 19, 19 of the elongated housing 11.

Following the assembly of the components identified above, lights 51 are inserted into the light sockets 35 to provide the lighted end compartments 13, 13 and intermediate compartment 15. As has been previously explained, the lead wires 45 of the lighted turn and stop signal unit 1 are electrically interconnected to the left turn and right turn indicators and automobile brake pedal, in the same manner as the brake lights and indicators mounted in the rear fenders or bumpers of an automobile.

In order to complete the assembly of the lighted turn and stop signal 1 of the present invention, reference is now made to FIG. 5 of the drawings. There it will be seen that the assembled components forming the lighted turn and stop signal unit 1 just described, are further provided with colored lenses, and an elongated material strip and a housing cover. Specifically, yellow plastic lenses 53, 53 are constructed for use with the opposed end compartments 13, 13 while a red plastic lens 55 is constructed for use with the intermediate compartment 15. This will permit the lighted turn and stop signal unit 1 to show a red light when the automobile 3 is in the braking or stopping mode, while also showing yellow lights for the left turn and right turn indicator arrows 7, 9.

In addition to the yellow lenses 53, 53 and the red lens 55, an elongated material strip 57 is provided which extends across the open sides of the compartments 13, 13 and 15 and is operatively associated with the colored lens covers 53, 53 and 55. The elongated material strip 57 includes an arrow shaped left-turn opening 59 and arrow shaped right-turn opening 61 for the end compartments 13, 13 of the housing 11, and an elongated intermediate opening 63 for the intermediate compartment 15. The elongated material strip is formed with the die cut arrow-shaped left turn and right turn openings 59, 61 and elongated intermediate opening 63, preferably from a pliable gasket material. The elongated material strip 57 may be mounted above or below the lens covers 53, 53 and 55, as may be appropriate.

A cover 65 is provided with elongated openings 67, 67 and intermediate opening 71, also for complementary association and register relative to the end compartments 13, 13 and intermediate compartment 15 of the housing 11. Suitable holes are provided in the cover 65 enabling threaded fasteners (not shown) to attach the cover 65 to the housing 11, thus overlying and capturing the elongated material strip 57 and colored lenses 53, 53 and 55 between the cover 65 and a housing 11. As described previously, the inwardly directed lugs 25, 25 and 27, 27 on the elongated sides 19, 19 and the inwardly directed lugs 29, 29 on the insides 21, 21 of the elongated housing include openings for aligned register with the opening 73 in the cover 65, for receipt of the threaded fasteners (not shown).

Figure 1:
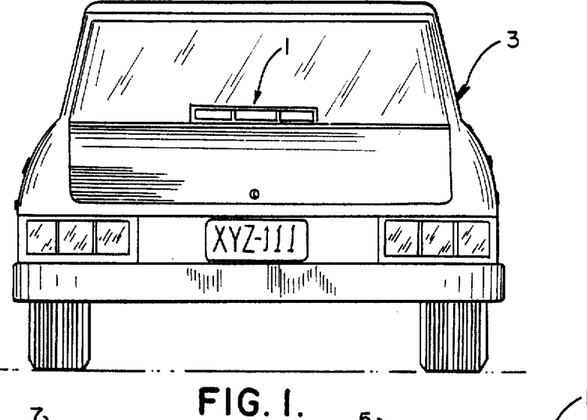
FIG. 1 is a rear elevational view of an automobile with the lighted turn and stop signal unit of the present invention incorporated therein.

When the lighted turn and stop signal unit 1 of the present invention is fully assembled and mounted in the position shown in FIG. 1 of the drawings on the inside rear shelf of an automobile 3, the lights 51 in each of the compartments 13, 13 and 15 will project a light beam through either the arrow-shaped left turn or right turn openings 59, 61 or the elongated intermediate opening 63 of the elongated material strip 57 in order to provide eye-level early advanced warning to following vehicles of turning or stopping the automobile containing the lighted turn and stop signal unit 1. To enable the automobile operator to observe operation of the lighted turn and stop signal unit 1, light hole 75 may be provided in each compartment the bottom wall side 17 of the housing, which side is opposite the open side 23 of the housing 11, such that an automobile operator may look in the rear view mirror and see light in any one of the three compartments 13, 13 and 15. Typically, an automobile operator may leave either the left turn or right turn signal indictors on, without becoming aware of this happening, and the light holes 75 in the bottom wall side 17 of each compartment of the unit 1 enables the automobile operator to determine that either the left turn or right turn indicator is still operating and must be deactivated.

Reference is now made to FIGS. 9–15 of the drawings for a description of a modified form of the present invention. This embodiment provides a separate light support bracket and light shield, as contrasted with the combined light shield and support element 31 in the FIGS. 5–8 embodiment.

Figure 15:
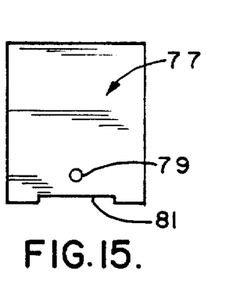
FIG. 15 is an end elevational view of one of the separate light shield elements utilized in the modified form of invention shown in FIGS. 9 and 11-15.

Specifically, the light shields 77 shown in FIG. 15 have a generally rectangular shape and are shaped and sized for reception into complementary shaped slots 79 formed in the inwardly directed mirror image slots 25, 25 and 27, 27. In this embodiment, only two light shields 77 are required to separate the elongated housing 11 into the end compartments 13, 13 and intermediate compartment 15. It will be noted that the slots 79 are provided in the opposed inwardly directed mirror image lugs 25, 25 and 27, 27 in an offsetting relationship relative to holes formed in the lugs for receipt of threaded fasteners for mounting the cover 65 relative to the housing 11. Each light shield 77 also includes the lead wire opening 79 for passage of lead wires 45 therethrough and a support bracket opening 81, for mounting over the support bracket 83, now to be described.

Figures 13, 14:
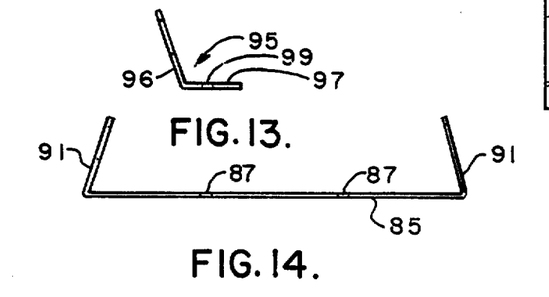
FIG. 13 is a side elevational view of the intermediate support section of the light support bracket illustrated in FIG. 12.
FIG. 14 is a side elevational view of the light support bracket illustrated in FIG. 12 including the integral upstanding light support sections at opposite ends of the bracket.

The support bracket 83 shown in FIGS. 9 and 11–14 is also preferably formed from metal and includes a bracket base 85 with holes 87 therein for receipt of threaded fasteners 89 (See FIG. 11) in order to secure the bracket base 85 to the bottom wall side 17 of the elongated housing 11. The light support bracket 83 includes integral upstanding light support sections 91, 91, each having holes 93 therein to facilitate assembly relative to the light sockets 35. As will be seen in FIGS. 9 and 11 of the drawings, the upstanding light support sections 91, 91 are constructed and dimensioned to be received within the end compartments 13, 13 of the elongated housing, with each of the light shields 77 having the bracket base 85 received within the bracket opening 81 thereof. For mounting a light in the intermediate section 15, a separate intermediate light support bracket 95 is provided as shown in FIG. 13. The intermediate light support bracket 95 includes a small base 97 with an opening 99 that registers with one of the openings 87 at the left hand side of the light support bracket 83, enabling a fastener 89 to extend through both the opening 99 and the base 97 of the intermediate light support bracket and the opening 87 in the base 85 of the overall light support bracket 83, so as to mount the intermediate support bracket 95 at the same time and in conjunction therewith to the bottom wall side 17 of the housing 11. Preferably, each of the light support sections 91, 91 for the end compartments 13, 13 and the light support section 96 of the intermediate light support bracket 95 extend at an angle of approximately 18° relative to the bracket base in order to permit the lights 51 to be located in a central position within each of the compartments 13, 13 and 15 of the housing. This provides equal light distribution in the compartments, while preventing unnecessary heat.

In addition to the aforementioned components in the FIGS. 9–15 embodiment, the lens covers 53, 53 and 55, the elongated material strip 57 and the cover 65 will be used in the same manner as in the FIGS. 5–8 embodiment. In some instances, clear plastic cover sections may be provided for the window opening 67, 67 and 71 of the cover 65, if desired.

From the foregoing, it will be appreciated that the two described embodiments of FIGS. 5–8 and FIGS. 9–15 are representative of the construction, arrangement and configuration of the various components that comprise the lighted turn and stop signal unit 1 of the present invention. It will also be appreciated that various design changes and modifications may be incorporated in the lighted turn and signal unit of the present invention, without changing the functioning of the unit as a lighted turn and brake signal unit or eye-level rear mounted use on the inside rear shelf of an automobile.

In view of the above, it will be seen that the several objects and features of this invention are achieved and other advantageous results obtained.

As various changes could be made in the above construction without departing from the scope of the invention, it is intended that all matter contained in the above description or shown in the accompanying drawings shall be interpreted as illustrative and not in a limiting sense.

I claim:

1. A lighted turn and stop signal unit for rear mounted, eye level use on an inside rear shelf of an automobile, comprising in combination:

an elongated housing having spaced end compartments and an intermediate compartment each having one open side on the same side thereof and serving together as the rear side of said unit when mounted on the inside rear shelf of an automobile, a light in each of the compartments which is shielded from the other compartments and visible from each open side, the lights in said end compartments being electrically connected to automobile left and right turn signal indicators, and the light in the intermediate compartment being electrically connected to the automobile brake pedal;

a plurality of light support brackets for supporting the lights; at least one of said light support brackets extending between two of the compartments and supporting the lights in both of the compartments;

light shields between said compartments and being operatively associated with said light support brackets to shield the light between said compartments;

colored lenses for the open side of each said compartment;

an elongated material strip extending across the open sides of said compartments and being operatively associated with said colored lenses, said elongated material strip including arrow-shaped left-turn and right-turn openings for the end compartments of said housing and an elongated intermediate opening for the intermediate compartment;

a cover secured to said housing which overlies and captures the elongated material strip and the colored lenses between said cover and said housing; and said elongated material strip including peripheral marginal areas serving as a gasket for engagement by both said cover and said housing when secured together, whereby when either said left or right turn indicators and/or the brake pedal is engaged, the lights in said compartments will project a light beam through the arrow-shaped left-turn or right-turn openings or the elongated intermediate opening of the elongated material strip to provide early advanced warning to following vehicles of turning or stopping by the automobile containing said unit.

2. The unit as defined in claim 1 wherein the colored lenses for the two end compartments have a different color than the colored lens for the intermediate compartment.

3. The unit as defined in claim 2 wherein the colored lenses for the two end compartments are colored yellow and the lenses for the intermediate compartment is colored red.

4. The unit as defined in claim 1 wherein said cover has window openings framing the arrow-shaped left-turn and right-turn openings in said elongated material strip for the end compartments and the elongated intermediate opening in the elongated material strip for the intermediate compartment.

5. The unit as defined in claim 4 and further including clear plastic cover sections for the window openings of said cover.

6. The unit as defined in claim 5 wherein said housing, said cover, said lenses and said cover sections are all made from plastic material.

7. The unit as defined in claim 6 wherein said light shields are formed as one-piece metal elements.

8. The unit as defined in claim 7 wherein said elongated material strip is formed from a pliable gasket material with said arrow-shaped left-turn and right-turn openings and the elongated intermediate opening all being die-cut.

9. The unit as defined in claim 8 including a light hole in each of the compartments of said housing on a side of said housing opposite said open side for observing operation by the automobile operator.

10. A lighted turn and stop signal unit for rear mounted, eye level use on an inside rear shelf of an automobile, comprising in combination:

an elongated housing having spaced end compartments and an intermediate compartment each having one open side on the same side thereof and serving together as the rear side of said unit when mounted on the inside rear shelf of an automobile, a light in each of the compartments which is shielded from the other compartments and visible from each open side, the lights in said end compartments being electrically connected to automobile left and right turn signal indicators, and the light in the intermediate compartment being electrically connected to the automobile brake pedal;

a plurality of light supporting brackets for the lights, one of said light supporting brackets extending between two of the compartments and supporting the lights in each of the compartments;

colored lenses for the open side of each compartment;

an elongated material strip extending across the open sides of said compartments and being operatively associated with said colored lenses, said elongated material strip including arrow-shaped left-turn and right-turn openings for the end compartments of said housing and an elongated intermediate opening for the intermediate compartment; and a cover secured to said housing which overlies and captures the elongated material strip and the colored lenses between said cover and said housing, whereby when either said left or right turn indicators and/or the brake pedal is engaged, the lights in said compartments will project a light beam through the arrow-shaped left-turn or right-turn openings or the elongated intermediate opening of the elongated material strip to provide early advanced warning to following vehicles of turning or stopping by the automobile containing said unit.

11. The unit as defined in claim 10 wherein one of said light support brackets includes a bracket base affixed to the bottom wall in at least one of said compartments, integral upstanding light supports at opposite ends of said bracket base for supporting the lights in said end compartments, and an another said light support bracket supporting a light in said intermediate compartment.

12. The unit as defined in claim 11 wherein each said light support extends at an angle of approximately 18° relative to said bracket base.

13. The unit as defined in claim 12 wherein a light shield is positioned between said compartment and extends substantially normal to the bracket base when said light shield is in place.

* * * * *

UNITED STATES PATENT AND TRADEMARK OFFICE
CERTIFICATE OF CORRECTION

PATENT NO. : 4,854,808

DATED : August 8, 1989

INVENTOR(S) : Bruno Bisiach

It is certified that error appears in the above-identified patent and that said Letters Patent is hereby corrected as shown below:

Title page:

[76] Inventor: "Bisiach Bruno" should be changed to
-- Bruno Bisiach --.

Signed and Sealed this

Second Day of October, 1990

Attest:

HARRY F. MANBECK, JR.

*Attesting Officer*   *Commissioner of Patents and Trademarks*

UNITED STATES PATENT AND TRADEMARK OFFICE
CERTIFICATE OF CORRECTION

PATENT NO. : 4,954,808
DATED : September 4, 1990
INVENTOR(S) : Manfred F. Duerkob It is certified that error appears in the above—identified patent and that said Letters Patent is hereby corrected as shown below:

On the title page, item (75) inventor's address should read
-- Inventor: Manfred F. Duerkob, Pacific, MO. --

In the Abstract, line 2 "an inside shelf of";
Should be -- an inside rear shelf of--.

Signed and Sealed this

Twenty-eighth Day of April, 1992

Attest:

HARRY F. MANBECK, JR.

*Attesting Officer*  *Commissioner of Patents and Trademarks*